July 9, 1940.  M. A. ELLIOTT  2,207,170
ADAPTER COUPLING
Filed May 27, 1939
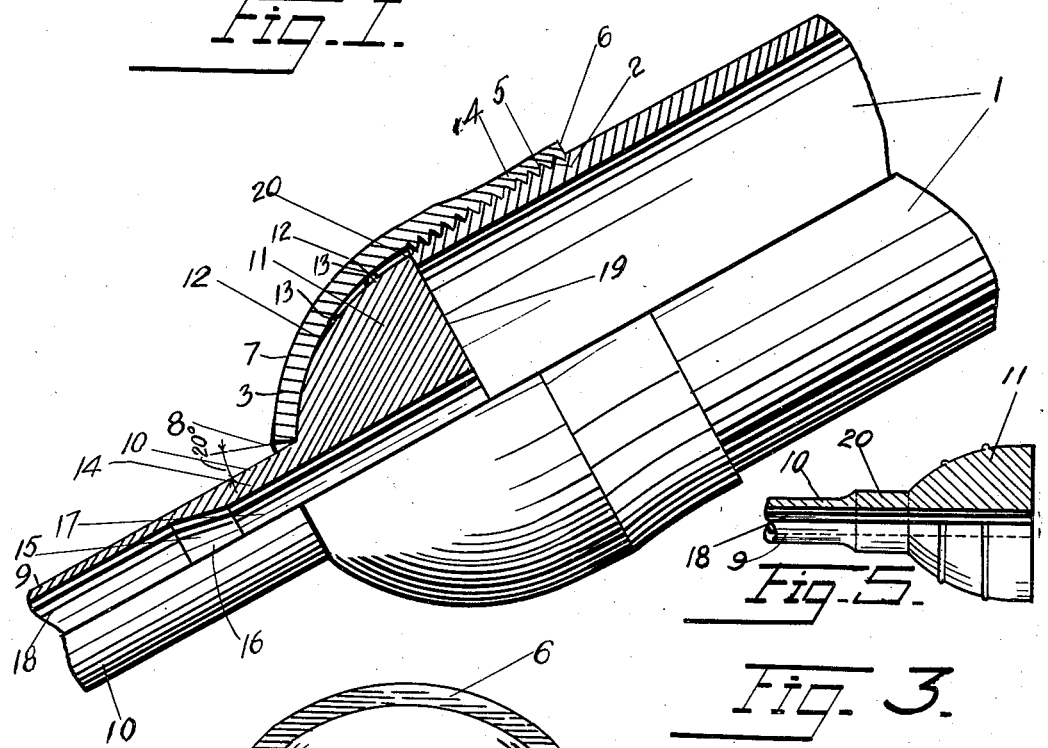
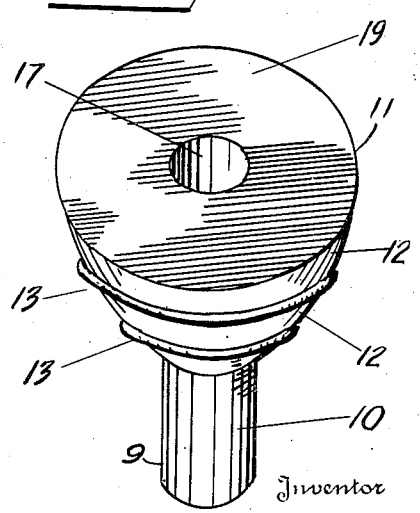
Inventor
MORRIS AUBREY ELLIOTT.
By Howard J. Whelan.
Attorney

UNITED STATES PATENT OFFICE 2,207,170

ADAPTER COUPLING

Morris Aubrey Elliott, Baltimore, Md.

Application May 27, 1939, Serial No. 276,198

3 Claims. (Cl. 285—120)

This invention refers to pipe couplings and more particularly to adapters for connecting rigid and flexible piping together, and especially where same are of different sizes. It has among its objects, to provide for a coupling of the simplest construction; one that will be mainly in one piece, which will provide for a stronger and more substantial connection; which will have special provision for making the connection leak-proof, and other objects that will become apparent as the invention is more fully set forth.

The usual type of coupling or adapter of this type consists of several parts which are loose and subject to constructional variations that affect the efficiency and effectiveness of the device. In this invention, the structural portion of the device has one main part, that elastically adapts itself to the rigid pipe at one end and provides for substantial and effective tightening on the flexible pipe or tube at the other end of it. The device is made by the forming of a shell into a shape that grasps the exterior surface of the tube and provides a suitable arrangement for enabling it to make a leak-tight joint with the shell, the tube being swaged to cooperate with this function. The other connecting portion of the shell is screw-threaded to engage resiliently with the rigid pipe and adjust itself to the latter, as it is screwed on. This is arranged by providing the shell with a straight screw-thread for engagement with the standard tapered pipe thread on the rigid pipe. The tube end portion of the shell avoids the use of screw threads. The end portion of the soft or flexible tube is swaged into an enlarged rounded, corrugated and tapered hollow head, to fit in wedge-like manner in the shell and tighten against the internal surface of same, under pressure exerted by the end portion of the rigid pipe in the head when the latter is screwed on. The shell permits ball-joint adjustment.

In the drawing which illustrates an example of this device—

Figure 1 is an elevation partly in section indicating a pipe adapter embodying this invention, connecting a rigid pipe with a soft tubing of smaller size, all in full connected position, Figure 2 is a detail of the shell in perspective, Figure 3 is a detail in perspective of the head formed on the soft tubing, Figure 4 is a sectional detail indicating the manner in which the shell reacts under the action of the rigid and soft piping.

Figure 5 is a modified form of soft tubing and head with full size passage inside, the view being half in longitudinal sectional elevation.

Similar reference characters refer to similar parts throughout the drawing.

In the drawing 1 represents a rigid steel pipe of conventional construction with an external screw thread 2 of standard tapered type thereon, such as is usual with this class of screw-threading. A hollow shell 3 having a relatively straight end portion 4 internally screw threaded at 5 with a straight thread, of same pitch as that used for the pipe. This portion has its wall thinned out towards its rim 6 to enable it to "give" resiliently outward when the tapered screw 2 is threaded therein, and thus keeps a uniform tension on the pipe. In addition, the wall is brought-in slightly towards the center in the unconnected coupling. The other end portion is of hollow form with the walls 7 bent in the form of a hollow semi-sphere and provided with an orifice 8 having 20 degree bevel preferably for the flexible tubing 9 to pass through, into the shell. The edges of the orifice are preferably formed to fit tightly against the interior wall surface 10 of the tubing where it enters the orifice. The tubing is "upset" at its end portion to the shape of head 11, indicated in the drawing, so as to fit in the shell 3 and wedge tightly in same as it is forced towards the orifice. The side surfaces 12 of this head are bent to a slightly different curve to that of the shell surface, and have ridges 13 concentrically mounted on same at spaced intervals, as shown. The tube exterior is unchanged in diameter, but interiorly the tube is thickened at its neck 14, where it connects with the head 11 by forcing material to this location during the upsetting process. This protects the tube from breaking off or kinking at the intersection with the head. The tube wall is tapered off at 15 to the tube portion proper, and the internal passage increased to normal dimensions. The remaining portions 16 and 17 in the tube shank have smaller passages that diminish about 10% from the main passage 18 in the tube to the passage in the head.

In the modification in Figure 5, the inside diameter is the same as the rest of the tubing, while the extra thickness extrudes outside as indicated at 20.

The upper face 19 of the head is flat and comes into contact with the end surface 20 of the pipe. As pressure is brought to bear on the head, by the screwing of the pipe into the shell the ridges engage with the internal walls of the shell, and being softer, expand slightly and make a leak-tight seal. The area of the ridges should be less than the surface of the end of the pipe. This has been found by the applicant to provide the most effective seal. The bevel at 8 allows angular positioning of the tube 9. The screw-thread 5 may be tapered or modified to suit the rigid pipe.

When the device is used, the tubing is "upset" and the material in it flowed, through the use of a die or other means, until the head is made as already described, and the tubing thickened at the neck. The shell is then inserted over the tubing until it fits over and against the head and the ridges, making contact with the surface of the former internally. The rigid pipe is then threaded into the shell. The taper screw thread of the pipe acts like a wedge and forces the rim portion 6 of the shell outwardly, especially when the taper threads on the pipe advance into the straight screw threads on the shell. The rim 6 of the shell is made to engage the thread on the pipe by being restricted in diameter at its mouth to do this, which is based on the normal taper of $\frac{1}{16}$ inch per foot in length. As the tapered thread goes in, it causes the straight threads to coact and spread the shell. When the rigid pipe is in far enough, it contacts the face of the head on the tubing and presses down on same, causing the ridges incidently to press against the surface of the shell internally and make a tight joint. If the pressure exerted by the screw thread engagement is severe, it presses out the ridges slightly and makes them act substantially like a gasket, since the material of the tubing is relatively soft compared with the shell. The ridges are not necessarily of the same height above the surface of the head, because the curved surface of the head approaches closer to the surface of the shell as it arrives at the orifice. Near the orifice, the curves of the shell and of the head practically meet. The increase of pressure on the head increases the contact area by wedging the surfaces closer together. The restricted portion 5 keeps the head 11 within the shell and being soft relatively is impressed by the rim of the rigid pipe.

The matter of "upsetting" the head, is for the purpose of making a homogenous integral head, instead of several separated parts, which are always subject to damage and subsequent leakage, as well as other troubles. The parts are usually, or can be factory made, and therefore do not involve difficult or complicated methods of assembly and construction. The form of the shell and head enables the device to adapt itself to various angles which the attachment of the tube and pipe may have to meet, and the ridges give the necessary surface engagement and resistance against the turning of the tubing while the shell is being tightened.

While but one form of the invention is shown in the drawing, it is not desired to limit this application for patent to the particular construction provided in the drawing and specification, otherwise than limited by the prior art, as it is appreciated that other forms might be made, that would employ the same principles and come within the scope of the appended claims.

Having thus described the invention, I claim:

1. In combination with a soft pipe, a coupling shell comprising an internally rounded surface arranged to engage the head portion of the soft pipe and permit angular adjustment thereof therein and a screw threaded-end portion having its rim slightly restricted to engage the tapered screw threaded portion of a rigid pipe and cause resilient widening thereof as the rigid pipe is screwed in, and bring the end thereof against the head end portion of the soft pipe and cause it to make close surface contact with the internal surface of the shell.

2. In combination with a soft pipe having an enlarged solid head, a coupling shell comprising an internally rounded surface arranged to engage the head portion of the soft pipe and permit adjustment of the walls thereof, and a screw threaded-end portion having its rim adapted to engage the screw threaded portion of rigid pipe and cause resilient widening thereof as the rigid pipe is screwed in more deeply and the end thereof brought against the said head portion of the soft pipe to cause it to make closer surface contact with the internal surface of the shell, and means between the solid head portion and the internal surface of the shell for cooperative engagement therewith.

3. In combination with a soft pipe having an enlarged solid head, a coupling shell comprising an internally rounded surface arranged to engage the head portion of the soft pipe and permit adjustment of the walls thereof, and a screw threaded-end portion having its rim adapted to engage the screw threaded portion of the rigid pipe, as the rigid pipe is screwed in more deeply and the end thereof brought against the said head portion of the soft pipe to cause it to make closer surface contact with the internal surface of the shell, and ridge means between the head portion and the shell for cooperative engagement therewith.

MORRIS AUBREY ELLIOTT.